United States Patent
Schwartz et al.

(10) Patent No.: US 12,166,896 B2
(45) Date of Patent: Dec. 10, 2024

(54) PREVENTING AN INCORRECT TRANSMISSION OF A COPY OF A RECORD OF DATA TO A DISTRIBUTED LEDGER SYSTEM

(71) Applicant: PolySign, Inc., Oakland, CA (US)

(72) Inventors: David Schwartz, Tiburon, CA (US); Arthur Britto, San Francisco, CA (US)

(73) Assignee: PolySign, Inc., Oakland, CA (US)

( * ) Notice: Subject to any disclaimer, the term of this patent is extended or adjusted under 35 U.S.C. 154(b) by 0 days.

(21) Appl. No.: 17/711,559

(22) Filed: Apr. 1, 2022

(65) Prior Publication Data

US 2022/0224541 A1   Jul. 14, 2022

Related U.S. Application Data

(63) Continuation of application No. 16/509,400, filed on Jul. 11, 2019, now Pat. No. 11,310,055.

(51) Int. Cl.
| | |
|---|---|
| *H04L 29/06* | (2006.01) |
| *G06Q 20/38* | (2012.01) |
| *H04L 9/32* | (2006.01) |
| *H04L 9/00* | (2022.01) |
| *H04L 9/06* | (2006.01) |

(52) U.S. Cl.
CPC ....... *H04L 9/3239* (2013.01); *G06Q 20/3821* (2013.01); *G06Q 20/3823* (2013.01); *H04L 9/3234* (2013.01); *H04L 9/3297* (2013.01); *H04L 9/0637* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | |
|---|---|---|
| 10,102,265 B1 | 10/2018 | Madisetti |
| 2018/0174143 A1 | 6/2018 | Bastide |
| 2018/0196694 A1 | 7/2018 | Banerjee |
| 2018/0218176 A1 | 8/2018 | Voorhees |
| 2018/0276666 A1 | 9/2018 | Haldenby |
| 2019/0156416 A1 | 5/2019 | Jayaram |
| 2020/0074518 A1 | 3/2020 | Kumaraswamy |
| 2020/0097460 A1 | 3/2020 | Keskar |
| 2020/0126075 A1 | 4/2020 | Fisch |
| 2020/0193744 A1 | 6/2020 | Pratz |
| 2020/0211003 A1 | 7/2020 | Fletcher |
| 2020/0213085 A1 | 7/2020 | Fletcher |

(Continued)

*Primary Examiner* — Jeffery L Williams
(74) *Attorney, Agent, or Firm* — Butzel Long (57) ABSTRACT

An incorrect transmission, of a record of data to a distributed ledger system, can be prevented. A first signal can be received. The first signal can include a first instruction to cause the record to be transmitted to the system. One or more items of information in the record can be determined. A delay of time to be elapsed, before a transmission of the record to the system, can be set in response to a receipt of the first signal and a determination of the one or more items. The transmission of the record to the system can be caused to occur after the delay has elapsed. The transmission of the record to the system can be prevented in response to a receipt of a second signal before the delay has elapsed. The second signal can include a second instruction that supersedes the first instruction.

16 Claims, 6 Drawing Sheets

| items of information in record of data | | portion of duration |
|---|---|---|
| Alice Jones | initiator | 30 days |
| | approver | 0 days |
| Bob Smith | initiator | 0 days |
| | approver | 0 days |
| Charlie Sanders | initiator | 30 days |
| | approver | 0 days |
| Dave Porter | initiator | 30 days |
| | approver | 0 days |
| Ellen Johnson | initiator | 0 days |
| | approver | 30 days |
| Fran Dunlop | initiator | 0 days |
| | approver | 0 days |
| other entity | initiator | 30 days |
| | approver | 30 days |
| Empire State Bank | transferor | 1 day |
| | transferee | 0 days |
| First National Bank | transferor | 0 days |
| | transferee | 0 days |
| other financial institute | transferor | 30 days |
| | transferee | 30 days |
| less than $1 million | transferor | 1 day |
| | transferee | 0 days |
| $1 million or more | transferor | 7 days |
| | transferee | 0 days |

(56) References Cited

U.S. PATENT DOCUMENTS

| | | |
|---|---|---|
| 2020/0356965 A1 | 11/2020 | Sharma |
| 2020/0380624 A1 | 12/2020 | Turgman |
| 2020/0387395 A1 | 12/2020 | Viale |
| 2020/0394183 A1 | 12/2020 | Jois |
| 2020/0394651 A1 | 12/2020 | Kreder, III |
| 2021/0014041 A1 | 1/2021 | Schwartz |
| 2021/0083872 A1 | 3/2021 | Desmarais |
| 2021/0152371 A1 | 5/2021 | Fletcher |
| 2021/0342838 A1* | 11/2021 | Hoggard ............ G06Q 20/3829 |

* cited by examiner

| transaction ID | transferor account no. | transferee account no. | amount of the transfer | identification of initiator | identification of 1st approver | identification of 2nd approver |
|---|---|---|---|---|---|---|
| 98765 | ESB4321098 | FNB765432 | 700000 | Fran Dunlop | Alice Jones | Charlie Sanders |

FIG. 3

| setting | | duration |
|---|---|---|
| less than $1 million | transferor | 1 day |
| | transferee | 0 days |
| $1 million or more | transferor | 7 days |
| | transferee | 0 days |

| items of information in record of data | | portion of duration |
|---|---|---|
| Alice Jones | initiator | 30 days |
| | approver | 0 days |
| Bob Smith | initiator | 0 days |
| | approver | 0 days |
| Charlie Sanders | initiator | 30 days |
| | approver | 0 days |
| Dave Porter | initiator | 30 days |
| | approver | 0 days |
| Ellen Johnson | initiator | 0 days |
| | approver | 30 days |
| Fran Dunlop | initiator | 0 days |
| | approver | 0 days |
| other entity | initiator | 30 days |
| | approver | 30 days |
| Empire State Bank | transferor | 1 day |
| | transferee | 0 days |
| First National Bank | transferor | 0 days |
| | transferee | 0 days |
| other financial institute | transferor | 30 days |
| | transferee | 30 days |
| less than $1 million | transferor | 1 day |
| | transferee | 0 days |
| $1 million or more | transferor | 7 days |
| | transferee | 0 days |

PREVENTING AN INCORRECT TRANSMISSION OF A COPY OF A RECORD OF DATA TO A DISTRIBUTED LEDGER SYSTEM

BACKGROUND

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

BRIEF DESCRIPTION OF THE DRAWINGS

The accompanying drawings, which are included to provide a further understanding of the disclosed technologies, are incorporated in and constitute a part of this specification. The drawings also illustrate implementations of the disclosed technologies and together with the detailed description serve to explain the principles of implementation of the disclosed technologies. No attempt is made to show structural details in more detail than may be necessary for a fundamental understanding of the disclosed technologies and the various ways in which it can be practiced.

DETAILED DESCRIPTION

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

The electronic ledger system can operate the blockchain. The electronic ledger system can include an electronic device or, alternatively, can include several electronic devices disposed in a peer-to-peer network. An electronic ledger system in which several electronic devices are disposed in a peer-to-peer network can be referred to as a distributed ledger system. Each electronic device in a distributed ledger system can be referred to as a node of the distributed ledger system. A distributed ledger system can include one or more of a public distributed ledger system or a private distributed ledger system. A private distributed ledger system can also be referred to as a permissioned distributed ledger system, a consortium distributed ledger system, or a hybrid distributed ledger system. In a private distributed ledger system, an entity that controls the private distributed ledger system can vet entities that operate nodes in the private distributed ledger system. Additionally, a private distributed ledger system can allow an entity to keep some information private such as, for example, credential information.

In a distributed ledger system, each node can save a copy of the blockchain. In response to a block being added to the blockchain, each node can update its copy of the blockchain. A consensus algorithm can receive, from the nodes, respective copies of the blockchain. The consensus algorithm can determine a consensus about which of the respective copies of the blockchain is a correct copy of the blockchain. In response to a determination of the consensus, the nodes can update their respective copies of the blockchain to be the correct copy of the blockchain. Because a distributed ledger system can use a consensus algorithm to determine the correct copy of the blockchain, an alteration of a record of data included in a copy of the blockchain stored at a node of the distributed ledger system can be prevented from being deemed to be the correct copy of the record of data. In this manner, a distributed ledger system can be used to ensure an authenticity of a record of data.

Unfortunately, operations performed by a distributed ledger system to update copies of the blockchain, to determine the consensus, and to update respective copies of the blockchain to be the correct copy of the blockchain can consume a substantial amount of time and energy. For example, an average Bitcoin transaction on the Bitcoin.org blockchain consumes about 215 kilowatt-hours of energy. For at least this reason, it is important to prevent an incorrect transmission of the copy of the record of data to the distributed ledger system. Particularly, in the case of a record of data associated with a transaction between entities, an incorrect transmission of the copy of the record of data to the distributed ledger system can cause one or more errors in the transaction to the detriment of one or both of the entities associated with the transaction.

The disclosed technologies can prevent an incorrect transmission of a copy of a record of data to a distributed ledger system. A first signal can be received. The first signal can include a first instruction to cause the copy of the record of data to be transmitted to the distributed ledger system. One or more items of information in the record of data can be determined. A delay of time to be elapsed, before a transmission of the copy of the record of data to the distributed ledger system, can be set in response to a receipt of the first signal and a determination of the one or more items of information. The transmission of the copy of the record of data to the distributed ledger system can be caused to occur after the delay of time has elapsed. The transmission of the copy of the record of data to the distributed ledger system can be prevented in response to a receipt of a second signal before the delay of time has elapsed.

Figure 1:
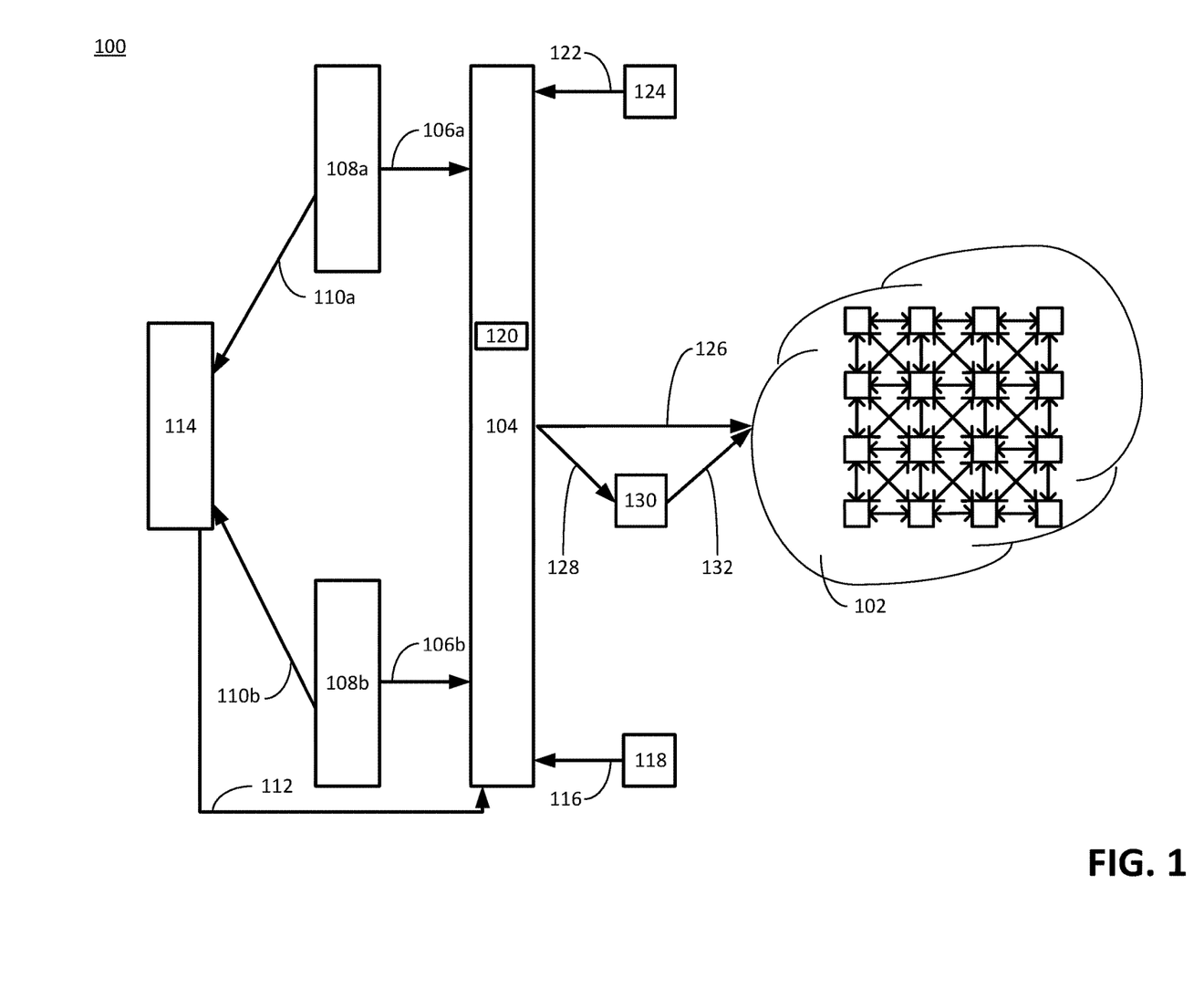
FIG. 1 is a diagram illustrating an example of an environment for preventing an incorrect transmission of a copy of a record of data to an electronic network, according to the disclosed technologies.

FIG. 1 is a diagram illustrating an example of an environment 100 for preventing an incorrect transmission of a copy of a record of data to an electronic network 102, according to the disclosed technologies. The environment 100 can include, for example, the electronic network 102 and a system 104 for preventing an incorrect transmission of a copy of a record of data to the electronic network 102. The record of data can be associated with an item for which an authentication of a copy is important. For example, the record of data can be associated with a transaction, a will or testament, a document related to a quality assurance program, a document to be used as evidence in a judicial proceeding, or the like. The electronic network 102 can include a distributed ledger system. If the record of data is associated with a transaction, then, additionally or alternatively, the electronic network 102 can include one or more of an Automated Clearing House network, a payment rail network, another electronic ledger system, or the like. If the electronic network 102 is a distributed ledger system, then the record of data can be included, by the distributed ledger system, in a block to be added, by the distributed ledger system, to a blockchain.

The system 104 can be configured to receive 106a a first signal. The first signal can include a first instruction to cause the copy of the record of data to be transmitted to the electronic network 102.

The system 104 can be configured to determine one or more items of information in the record of data.

The system 104 can be configured to set, in response to a receipt of the first signal and a determination of the one or more items of information, a delay of time to be elapsed before a transmission of the copy of the record of data to the electronic network 102.

The system 104 can be configured to cause, after the delay of time has elapsed, the transmission of the copy of the record of data to the electronic network 102.

The system 104 can be configured to prevent, in response to a receipt of a second signal before the delay of time has elapsed, the transmission of the copy of the record of data to the electronic network 102. The second signal can include a second instruction that supersedes the first instruction.

In a first optional implementation of the disclosed technologies, the record of data can be associated with a transaction. For example, the one or more items of information can include one or more of an amount of the transaction, an identification of a transferor account, or an identification of a transferee account. Additionally, for example, the one or more items of information can further include one or more of an identification of the transaction, an identification of an entity that initiated the transaction, or one or more identifications of one or more entities that approved the transaction.

Figures 2, 3:
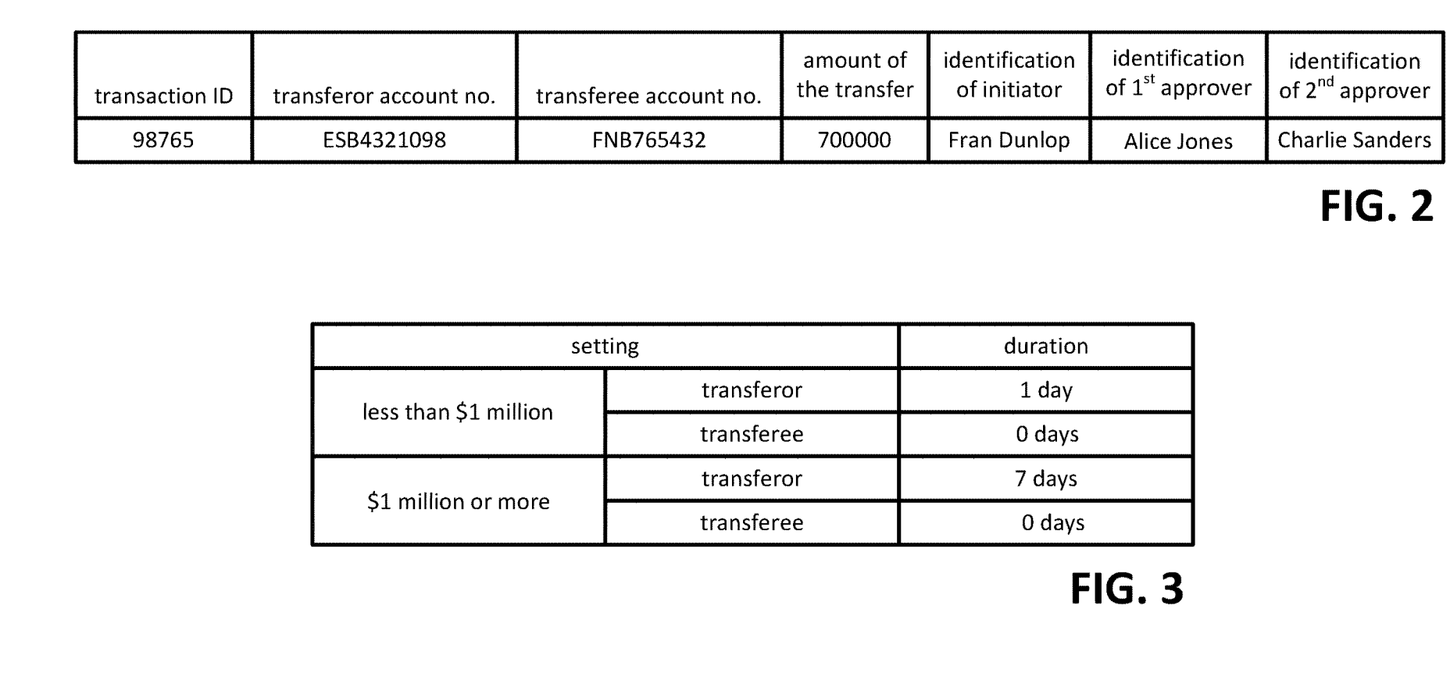
FIG. 2 is a diagram illustrating an example of the record of data, according to the disclosed technologies.
FIG. 3 is a diagram illustrating an example of a plurality of settings of durations of delays of time, according to the disclosed technologies.

FIG. 2 is a diagram illustrating an example of the record of data, according to the disclosed technologies. For example, the one or more items of information can include the amount of the transaction ($700,000), the identification of the transferor account (ESB4321098), and the identification of the transferee account (FNB765432). For example, the one or more items of information can further include the identification of the transaction (98765), the identification of the entity that initiated the transaction (Fran Dunlop), the identification of the first entity that approved the transaction (Alice Jones), and identification of the second entity that approved the transaction (Charlie Sanders).

Returning to FIG. 1, in a second optional implementation of the disclosed technologies, the first signal can include a plurality of first signals and the first instruction can include a plurality of first instructions. For example, the system 104 can be configured to receive 106a and 106b the plurality of first signals from a device 108a and a device 108b. In the second optional implementation, the system 104 can be further configured to determine that a count of the plurality of first signals is greater than a threshold. In the second optional implementation, the system 104 can be configured to set, in response to the count being greater than the threshold, the delay of time.

In a third optional implementation of the disclosed technologies, the system 104 can be configured to receive 106a the first signal from the device 108a. The device 108a can be associated with an entity that is authorized to cause the copy of the record of data to be transmitted to the electronic network 102. Alternatively, for example, the system 104 can be configured to receive 110a and 112 the first signal from the device 108a via one or more intermediate devices 114.

In the third optional implementation, the receipt of the second signal can include a receipt of the second signal from the device 108a. Alternatively, the receipt 116 of the second signal can include a receipt of the second signal from a device 118. The device 118 can be unassociated with the entity that is authorized to cause the copy of the record of data to be transmitted to the electronic network 102.

In a fourth optional implementation of the disclosed technologies, the receipt of the second signal can include a receipt of the second signal from an operation 120 performed by the system 104.

In a fifth optional implementation of the disclosed technologies, the system 104 can be further configured to receive the copy of the record of data. For example, the system 104 can be configured to receive 106a the copy of the record of data from the device 108a. The device 108a can be associated with the entity that is authorized to cause the copy of the record of data to be transmitted to the electronic network 102. Alternatively, for example, the system 104 can be configured to receive 122 the copy of the record of data from a device 124. The device 124 can be unassociated with the entity that is authorized to cause the copy of the record of data to be transmitted to the electronic network 102.

In a sixth optional implementation of the disclosed technologies, the system 104 can be further configured to determine, in response to the determination of the one or more items of information, a duration of the delay of time.

For example, the system 104 can be configured to determine the duration of the delay of time by selecting the duration of the delay of time from a plurality of settings of durations of delays of time. FIG. 3 is a diagram illustrating an example of a plurality of settings of durations of delays of time, according to the disclosed technologies. For example, with reference to FIGS. 1 through 3, the system 104 can be configured to determine the duration of the delay of time by selecting the duration of the delay of time (1 day (based upon the entity being a transferor in a transaction ($700,000) of less than $1 million) from the plurality of settings of durations of delays of time.

Alternatively, for example, the system 104 can be configured to determine the duration of the delay of time by calculating a sum of portions of the duration of the delay of time determined from items of information in the record of data. For example, the system 104 can be configured to determine the one or more items of information by: (1) determining a first item of the one or more items of information, (2) determining a second item of the one or more items of information, etc. Then, the system 104 can be configured to determine the duration of the delay of time by: (1) determining, in response to a determination of the first item, a first portion of the duration of the delay of time, (2) determining, in response to a determination of the second item, a second portion of the duration of the delay of time, etc., and (3) calculating a sum of the first portion added to the second portion. The sum can be the duration of the delay of time.

Figure 4:
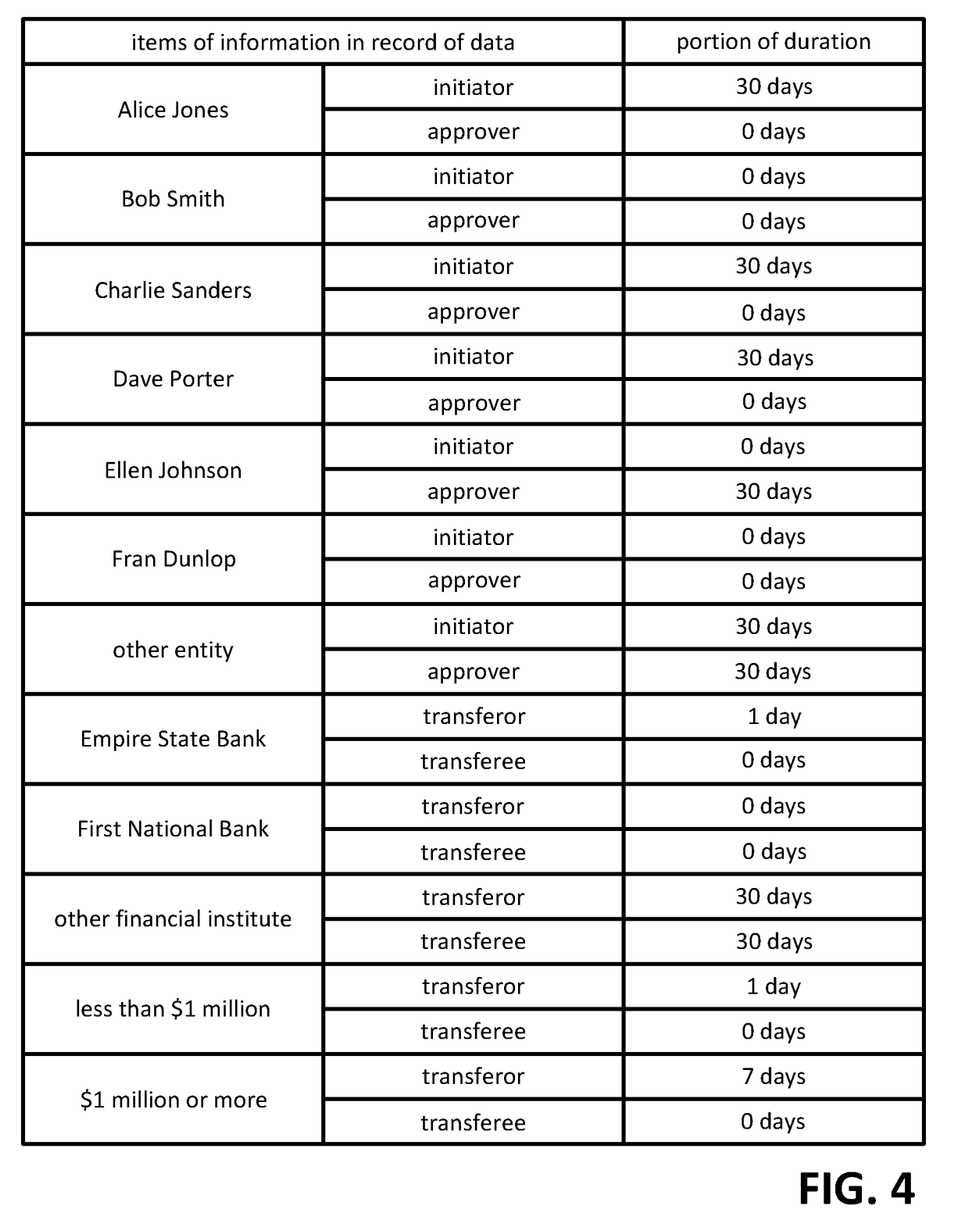
FIG. 4 is a diagram illustrating an example of items of information in the record of data and portions of a duration of a delay of time, according to the disclosed technologies.

FIG. 4 is a diagram illustrating an example of items of information in the record of data and portions of a duration of a delay of time, according to the disclosed technologies. For example, with reference to FIGS. 1, 2, and 4, the system 104 can be configured to determine: (1) the first item is that Empire State Bank is the transferor, (2) the second item is that First National Bank is the transferee, (3) the third item is that $700,000 is the amount of the transaction, (4) the fourth item is that Fran Dunlop is the initiator, (5) the fifth item is that Alice Jones is the first approver, and (6) the sixth item is that Charlie Sanders is the second approver. Then, the system 104 can be configured: (1) to determine: (a) the first portion is 1 day (based upon Empire State Bank being the transferor), (b) the second portion is 0 days (based upon First National Bank being the transferee), (c) the third portion is 1 day (based upon the entity being a transferor in a transaction of less than $1 million), (d) the fourth portion is 0 days (based upon Fran Dunlop being the initiator), (e) the fifth portion is 0 days (based upon Alice Jones being the first approver), and (f) the sixth portion is 0 days (based upon Charlie Sanders being the second approver), and (2) to calculate the sum of the first portion (1 day), the second portion (0 days), the third portion (1 day), the fourth portion (0 days), the fifth portion (0 days), and the sixth portion (0 days). The sum (2 days) can be the duration of the delay of time.

As stated above, the system 104 can be configured to cause, after the delay of time has elapsed, the transmission of the copy of the record of data to the electronic network 102. For example, the system 104 can be configured to transmit 126 the copy of the record of data to the electronic network 102. Alternatively, for example, the system 104 can be configured to send 128 the copy of the record of data to a remote device 130. The copy of the record of data can be transmitted 132 to the electronic network 102 by the remote device 130.

As stated above, the disclosed technologies can prevent an incorrect transmission of a copy of a record of data to the electronic network 102. An intended transmission of a record of data can be incorrect for a variety of reasons. For example, one or more of the items of information in the record of data can simply be incorrect. In another example, the entity that initiated the transaction and the entities that approved the transaction can have been coerced to attempt to cause the copy of the record of data to be transmitted to the electronic network 102.

For example, with reference to FIGS. 1, 2, and 4, an evildoer can have coerced Fran Dunlop, Alice Jones, and Charlie Sanders to initiate and to approve a transaction of $700,000 from Empire State Bank not to First National Bank (as illustrated in FIG. 2), but to Sketchy Savings & Loan (not illustrated). Then, the system 104 can be configured: (1) to determine: (a) the first portion is 1 day (based upon Empire State Bank being the transferor), (b) the second portion is 30 days (based upon Sketchy Savings & Loan (other financial institute) being the transferee), (c) the third portion is 1 day (based upon the entity being a transferor in a transaction of less than $1 million), (d) the fourth portion is 0 days (based upon Fran Dunlop being the initiator), (e) the fifth portion is 0 days (based upon Alice Jones being the first approver), and (f) the sixth portion is 0 days (based upon Charlie Sanders being the second approver), and (2) to calculate the sum of the first portion (1 day), the second portion (30 days), the third portion (1 day), the fourth portion (0 days), the fifth portion (0 days), and the sixth portion (0 days). The sum (32 days) can be the duration of the delay of time. Hopefully, having the duration of the delay of time being 32 days is a sufficient duration of time so that the second signal can be received before the 32-day delay of time has elapsed and the transmission of the copy of the record of data to the electronic network 102 can be prevented.

As stated above, if the system 104 is in the third optional implementation, then the receipt of the second signal can include a receipt of the second signal from the device 108a. For example, one or more of Fran Dunlop, Alice Jones, or Charlie Sanders, no longer being coerced, can cause the second signal to be transmitted from the device 108a to the system 104. Alternatively, for example, another individual in the organization that includes Fran Dunlop, Alice Jones, or Charlie Sanders can cause the second signal to be transmitted from the device 108a to the system 104.

Alternatively, as stated above, if the system 104 is in the third optional implementation, then the receipt of the second signal can include a receipt of the second signal from the device 118. For example, the other individual in the organization that includes Fran Dunlop, Alice Jones, or Charlie Sanders can cause the second signal to be transmitted from the device 118 to the system 104. Alternatively, for example, an individual in a law enforcement agency can cause the second signal to be transmitted from the device 118 to the system 104.

Alternatively, as stated above, if the system 104 is in the fourth optional implementation, then the receipt of the second signal can include a receipt of the second signal from the operation 120 performed by the system 104.

Figure 5:
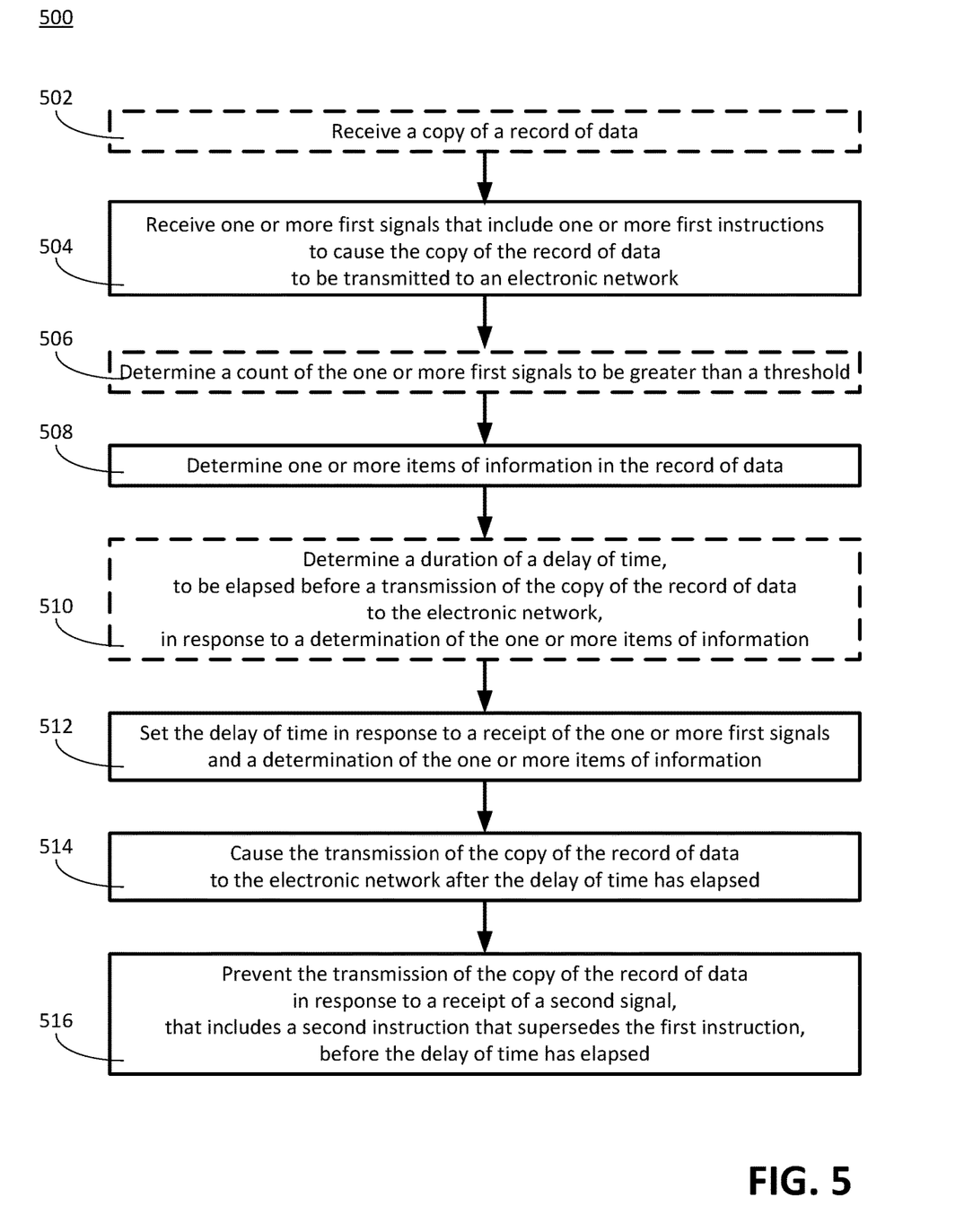
FIG. 5 is a flow diagram illustrating an example of a method for preventing the incorrect transmission of the copy of the record of data to the electronic network, according to the disclosed technologies.

FIG. 5 is a flow diagram illustrating an example of a method 500 for preventing the incorrect transmission of the copy of the record of data to the electronic network, according to the disclosed technologies. The record of data can be associated with an item for which an authentication of a copy is important. For example, the record of data can be associated with a transaction, a will or testament, a document related to a quality assurance program, a document to be used as evidence in a judicial proceeding, or the like. The electronic network can include a distributed ledger system.

If the record of data is associated with a transaction, then, additionally or alternatively, the electronic network can include one or more of an Automated Clearing House network, a payment rail network, another electronic ledger system, or the like. If the electronic network is a distributed ledger system, then the record of data can be included, by the distributed ledger system, in a block to be added, by the distributed ledger system, to a blockchain.

In a first optional implementation of the method 500, at an optional operation 502, the copy of the record of data can be received. For example, the copy of the record of data can be received from a first device. The first device can be associated with an entity that is authorized to cause the copy of the record of data to be transmitted to the electronic network. Alternatively, for example, the copy of the record of data can be received from a second device. The second device can be unassociated with the entity that is authorized to cause the copy of the record of data to be transmitted to the electronic network.

At an operation 504, a first signal can be received. The first signal can include a first instruction to cause the copy of the record of data to be transmitted to the electronic network.

In a second optional implementation of the method 500, the first signal can include a plurality of first signals and the first instruction can include a plurality of first instructions. For example, the plurality of first signals can be received from a plurality of devices. In the second optional implementation, at an optional operation 506, a count of the plurality of first signals can be determined to be greater than a threshold.

In a third optional implementation of the method 500, the first signal can be received from the first device. Alternatively, for example, the first signal can be received from the first device via one or more intermediate devices.

At an operation 508, one or more items of information in the record of data can be determined.

In a fourth optional implementation of the method 500, the record of data can be associated with a transaction. For example, the one or more items of information can include one or more of an amount of the transaction, an identification of a transferor account, or an identification of a transferee account. Additionally, for example, the one or more items of information can further include one or more of an identification of the transaction, an identification of an entity that initiated the transaction, or one or more identifications of one or more entities that approved the transaction.

At an optional operation 510, a duration of a delay of time, to be elapsed before a transmission of the copy of the record of data to the electronic network, can be determined in response to a determination of the one or more items of information.

For example, the duration of the delay of time can be determined by selecting the duration of the delay of time from a plurality of settings of durations of delays of time.

Figure 6:
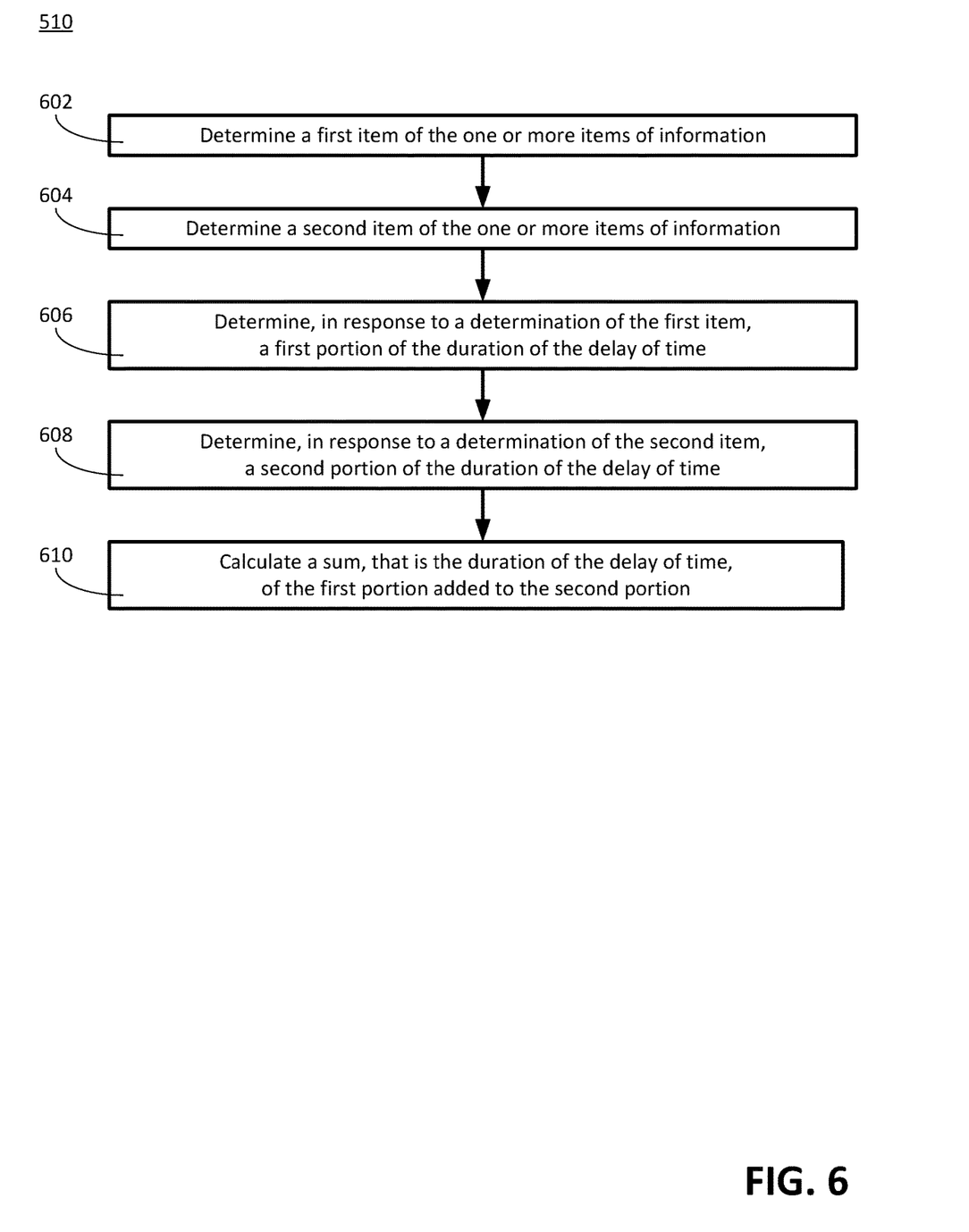
FIG. 6 is a flow diagram illustrating an example of a method for determining the duration of the delay of time, according to the disclosed technologies.

Alternatively, for example, the duration of the delay of time can be determined by calculating a sum of portions of the duration of the delay of time determined from items of information in the record of data. FIG. 6 is a flow diagram illustrating an example of a method 510 for determining the duration of the delay of time, according to the disclosed technologies. In the method 510, at an operation 602, a first item of the one or more items of information can be determined. At an operation 604, a second item of the one or more items of information can be determined. At an operation 606, a first portion of the duration of the delay of time can be determined in response to a determination of the first item. At an operation 608, a second portion of the duration of the delay of time can be determined in response to a determination of the second item. At an operation 610, a sum of the first portion added to the second portion can be calculated. The sum can be the duration of the delay of time.

Returning to FIG. 5, at an operation 512, the delay of time can be set in response to a receipt of the first signal and a determination of the one or more items of information. If the method 500 includes performing the operation 510, then the delay of time can further be set in response to the count being greater than the threshold.

At an operation 514, the transmission of the copy of the record of data to the electronic network can be caused to occur after the delay of time has elapsed. Optionally, the copy of the record of data can be sent to a remote device. The copy of the record of data can be transmitted to the electronic network by the remote device.

At an operation 516, the transmission of the copy of the record of data to the electronic network can be prevented in response to a receipt of a second signal before the delay of time has elapsed. The second signal can include a second instruction that supersedes the first instruction.

In a fifth optional implementation of the method 500, the receipt of the second signal can include a receipt of the second signal from the first device. Alternatively, the receipt of the second signal can include a receipt of the second signal from a third device. The third device can be unassociated with the entity that is authorized to cause the copy of the record of data to be transmitted to the electronic network.

In a sixth optional implementation of the method 500, the receipt of the second signal can include a receipt of the second signal from an operation performed by a system for preventing the incorrect transmission of the copy of the record of data to the electronic network.

In general, in light of the technologies described above, one of skill in the art understands that technologies to prevent an incorrect transmission of a copy of a record of data to an electronic network can include any combination of some or all of the foregoing configurations.

Figure 7:
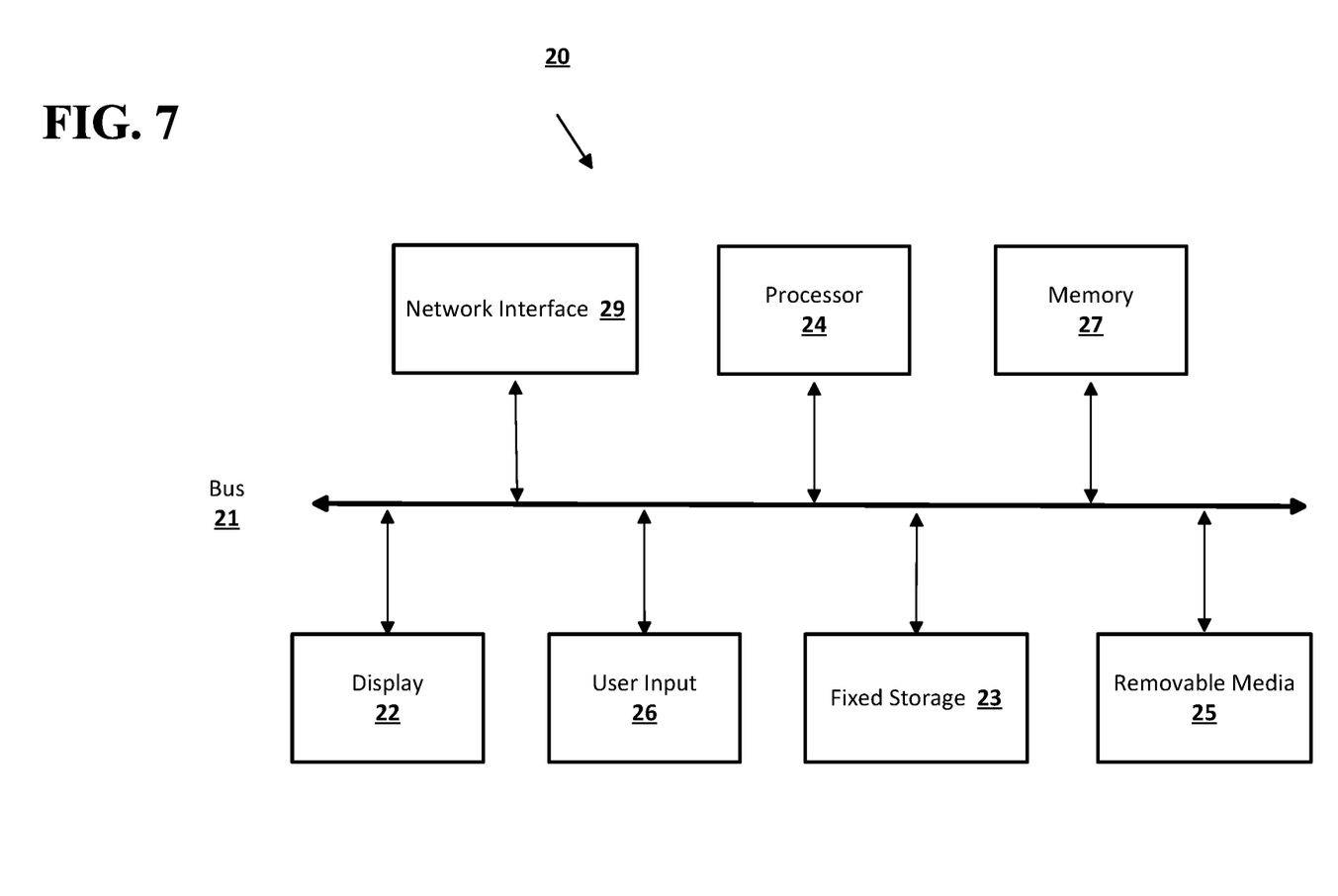
FIG. 7 illustrates an example computing device suitable for implementing configurations of the disclosed technologies.

Configurations of the disclosed technologies may be implemented in and used with a variety of component and network architectures. FIG. 7 illustrates an example computing device 20 suitable for implementing configurations of the disclosed technologies. The device 20 can be, for example, a desktop or laptop computer, or a mobile computing device such as a smart phone, tablet, or the like. The device 20 can include a bus 21 (which can interconnect major components of the computer 20, such as a central processor 24), a memory 27 (such as random-access memory (RAM), read-only memory (ROM), flash RAM, or the like), a user display 22 (such as a display screen), a user input interface 26 (which can include one or more controllers and associated user input devices such as a keyboard, mouse, touch screen, and the like), a fixed storage 23 (such as a hard drive, flash storage, and the like), a removable media component 25 (operative to control and receive an optical disk, flash drive, and the like), and a network interface 29 operable to communicate with one or more remote devices via a suitable network connection.

The bus 21 can allow data communication between the central processor 24 and one or more memory components, which can include RAM, ROM, and other memory, as previously noted. Typically RAM can be the main memory into which an operating system and application programs are loaded. A ROM or flash memory component can contain, among other code, the basic input-output system (BIOS) which can control basic hardware operation such as the interaction with peripheral components. Applications resident with the computer 20 can generally be stored on and accessed via a computer readable medium, such as a hard disk drive (e.g., fixed storage 23), an optical drive, floppy disk, or other storage medium.

The fixed storage 23 can be integral with the computer 20 or can be separate and accessed through other interfaces. The network interface 29 can provide a direct connection to a remote server via a wired or wireless connection. The network interface 29 can provide such connection using any suitable technique and protocol as is readily understood by one of skill in the art, including digital cellular telephone, WiFi™, Bluetooth®, near-field, and the like. For example, the network interface 29 can allow the computer to communicate with other computers via one or more local, wide-area, or other communication networks, as described in further detail below.

Many other devices or components (not illustrated) can be connected in a similar manner (e.g., document scanners, digital cameras, and so on). Conversely, all of the components illustrated in FIG. 7 need not be present to practice the disclosed technologies. The components can be interconnected in different ways from that illustrated. The operation of a computer such as that illustrated in FIG. 7 is readily known in the art and is not discussed in detail in this application. Code to implement the disclosed technologies can be stored in computer-readable storage media such as one or more of the memory 27, fixed storage 23, removable media 25, or on a remote storage location.

More generally, various configurations of the presently disclosed technologies can include or be realized in the form of computer-implemented processes and apparatuses for practicing those processes. Configurations also can be realized in the form of a computer program product having computer program code containing instructions embodied in non-transitory and/or tangible media, such as floppy diskettes, CD-ROMs, hard drives, universal serial bus (USB) drives, or any other machine readable storage medium, such that when the computer program code is loaded into and executed by a computer, the computer becomes an apparatus for practicing configurations of the disclosed technologies. Configurations also can be realized in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing configurations of the disclosed technologies. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Configurations can be implemented using hardware that can include a processor, such as a general purpose microprocessor and/or an application-specific integrated circuit (ASIC) that embodies all or part of the techniques according to configurations of the disclosed technologies in hardware and/or firmware. The processor can be coupled to memory, such as RAM, ROM, flash memory, a hard disk or any other device capable of storing electronic information. The memory can store instructions adapted to be executed by the processor to perform the techniques according to configurations of the disclosed technologies.

The foregoing description, for purpose of explanation, has been described with reference to specific configurations. However, the illustrative discussions above are not intended to be exhaustive or to limit configurations of the disclosed technologies to the precise forms disclosed. Many modifications and variations are possible in view of the above teachings. The configurations were chosen and described in order to explain the principles of the disclosed technologies and their practical applications, to thereby enable others skilled in the art to utilize those configurations as well as various configurations with various modifications as may be suited to the particular use contemplated.

The invention claimed is:

1. A method for preventing an incorrect transmission of a copy of a record of data associated with a transaction to a distributed ledger system, the method comprising:
  receiving, by a processor, a first signal, wherein the first signal includes a first instruction to cause the copy of the record of data to be transmitted to the distributed ledger system;
  determining, by the processor, a plurality of items of information in the record of data, each item of the plurality of items comprising an item selected from the group consisting of: an identification of the transaction, an amount of the transaction, an identification of a transferor account, an identification of a transferee account, an identification of an entity that initiated the transaction, and an identification of an entity that approved the transaction;
  determining, by the processor, a time period for each of the plurality of items of information;
  determining, by the processor, a time period as a sum of the time periods determined for the plurality of items of information;
  subsequent to determining the time period, setting, by the processor and in response to a receipt of the first signal and a determination of the at least one item of information, a delay of time to be elapsed before a transmission of the copy of the record of data to the distributed ledger system, the delay of time being equal to the time period;
  causing, by the processor and after the delay of time has elapsed, the transmission of the copy of the record of data to the distributed ledger system; and
  preventing, by the processor and in response to a receipt of a second signal before the delay of time has elapsed, the transmission of the copy of the record of data to the distributed ledger system, wherein the second signal includes a second instruction that supersedes the first instruction.

2. The method of claim 1, wherein the record of data is to be included, by the distributed ledger system, in a block to be added, by the distributed ledger system, to a blockchain.

3. The method of claim 1:
  wherein the first signal comprises a plurality of first signals;
  wherein the first instruction comprises a plurality of first instructions;
  further comprising determining, by the processor, that a count of the plurality of first signals is greater than a threshold; and
  wherein the setting the delay of time comprises setting, in response to the count being greater than the threshold, the delay of time.

4. The method of claim 1, wherein the receiving the first signal comprises receiving the first signal from a first device, wherein the first device is associated with an entity that is authorized to cause the copy of the record of data to be transmitted to the distributed ledger system.

5. The method of claim 4, wherein the receiving the first signal from the first device comprises receiving the first signal from the first device via at least one intermediate device.

6. The method of claim 4, wherein the receipt of the second signal comprises a receipt of the second signal from the first device.

7. The method of claim 4, wherein the receipt of the second signal comprises a receipt of the second signal from a second device.

8. The method of claim 1, wherein the receipt of the second signal comprises a receipt of the second signal from an operation performed by the processor.

9. The method of claim 1, further comprising receiving, by the processor, the copy of the record of data.

10. The method of claim 9, wherein the receiving the copy of the record of data comprises receiving the copy of the record of data from a device, wherein the device is associated with an entity that is authorized to cause the copy of the record of data to be transmitted to the distributed ledger system.

11. The method of claim 9, wherein the receiving the copy of the record of data comprises receiving the copy of the record of data from a device, wherein the device is unassociated with an entity that is authorized to cause the copy of the record of data to be transmitted to the distributed ledger system.

12. The method of claim 1, further comprising determining, by the processor and in response to the determination of the plurality of items of information, a duration of the delay of time.

13. The method of claim 12, wherein the determining the duration of the delay of time comprises selecting the duration of the delay of time from a plurality of settings of durations of delays of time.

14. The method of claim 1, wherein the causing the transmission of the copy of the record of data to the distributed ledger system comprises sending the copy of the record of data to a remote device, the copy of the record of data to be transmitted to the distributed ledger system by the remote device.

15. A non-transitory computer-readable medium storing computer code for controlling a processor to cause the processor to prevent an incorrect transmission of a copy of a record of data associated with a transaction to a distributed ledger system, the computer code including instructions to cause the processor to:
receive a first signal, wherein the first signal includes a first instruction to cause the copy of the record of data to be transmitted to the distributed ledger system;
determine a plurality of items of information in the record of data, each item of the plurality of items comprising an item selected from the group consisting of: an identification of the transaction, an amount of the transaction, an identification of a transferor account, an identification of a transferee account, an identification of an entity that initiated the transaction, and an identification of an entity that approved the transaction;
determine a time period for each of the plurality of items of information;
determine a time period as a sum of the time periods determined for the plurality of items of information;
subsequent to determining the time period, set, in response to a receipt of the first signal and a determination of the at least one item of information, a delay of time to be elapsed before a transmission of the copy of the record of data to the distributed ledger system, the delay of time being equal to the time period;
cause, after the delay of time has elapsed, the transmission of the copy of the record of data to the distributed ledger system; and
prevent, in response to a receipt of a second signal before the delay of time has elapsed, the transmission of the copy of the record of data to the distributed ledger system, wherein the second signal includes a second instruction that supersedes the first instruction.

16. A system for preventing an incorrect transmission of a copy of a record of data associated with a transaction to a distributed ledger system, the system comprising:
a memory configured to store the copy of the record of data, a first signal, a first instruction, a second signal, and a second instruction; and
a processor configured to:
receive the first signal, wherein the first signal includes the first instruction to cause the copy of the record of data to be transmitted to the distributed ledger system;
determine a plurality of items of information in the record of data, each item of the plurality of items comprising an item selected from the group consisting of: an identification of the transaction, an amount of the transaction, an identification of a transferor account, an identification of a transferee account, an identification of an entity that initiated the transaction, and an identification of an entity that approved the transaction;
determine a time period for each of the plurality of items of information;
determine a time period as a sum of the time periods determined for the plurality of items of information;
subsequent to determining the time period, set, in response to a receipt of the first signal and a determination of the at least one item of information, a delay of time to be elapsed before a transmission of the copy of the record of data to the distributed ledger system;
cause, after the delay of time has elapsed, the transmission of the copy of the record of data to the distributed ledger system; and
prevent, in response to a receipt of the second signal before the delay of time has elapsed, the transmission of the copy of the record of data to the distributed ledger system,
wherein the second signal includes the second instruction that supersedes the first instruction.

* * * * *